Feb. 26, 1935.  F. D. FUNSTON  1,992,526

SHOCK ABSORBER

Filed July 13, 1933

INVENTOR
FREDERICK D. FUNSTON
BY
Spencer, Hardman and John
ATTORNEYS

Patented Feb. 26, 1935

1,992,526

UNITED STATES PATENT OFFICE 1,992,526

SHOCK ABSORBER

Frederick D. Funston, Dayton, Ohio, assignor, by mesne assignments, to General Motors Corporation, Detroit, Mich., a corporation of Delaware Application July 13, 1933, Serial No. 680,198

9 Claims. (Cl. 188—88)

This invention relates to improvements in hydraulic shock absorbers.

It is among the objects of the present invention to provide a hydraulic shock absorber of simple structure and design, capable of controlling both the approaching and separating movements of two relatively movable members, namely the frame and axles of a motor vehicle.

Further objects and advantages of the present invention will be apparent from the following description, reference being had to the accompanying drawing wherein a preferred embodiment of one form of the present invention is clearly shown.

Figure 1:
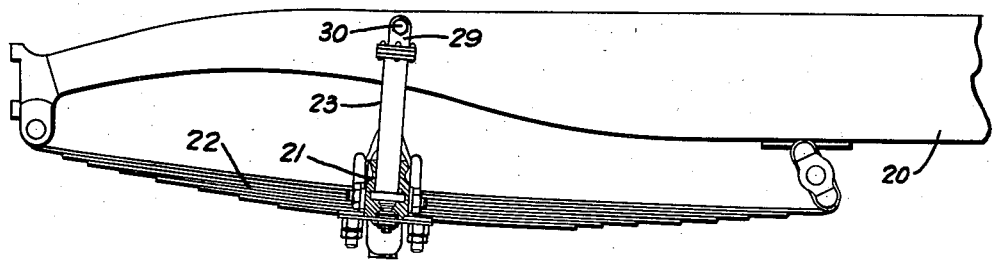
Fig. 1 is a fragmentary side view of a vehicle chassis showing a shock absorber, equipped with the present invention applied thereto.

Referring to the drawing, the numeral 20 designates the frame of the vehicle which is supported upon the vehicle axle 21 by springs 22, the ends of which are hingedly secured to the frame.

The shock absorber, designated as a whole by the numeral 23, comprises a casing 24 providing a fluid reservoir 25 and a cylinder 26. The one end of the casing has ears 27 extending therefrom, said ears being provided with openings 28 for receiving bolts by which an anchor block 29 is attached to the shock absorber. This anchor block 29 is hingedly secured to the vehicle frame 20 by the member 30. At the end of the cylinder 24 opposite the ears 27 a screw plug 32 is provided to close this end of the cylinder, a gasket 33 being clamped between the plug 32 and the casing 24 to prevent leaks. The reservoir 25 is in communication with a duct 35 running longitudinally of the cylinder 26 in the casing 24, this duct 35 communicating with a passage 36 in the plug 32, passage 36 in turn communicating with a port 37 leading to the interior of the cylinder 26.

Within the cylinder 26 there is provided a piston 40 which divides the cylinder into two fluid displacement chambers 41 and 42 respectively. This piston has one end of a piston actuating member or rod 43 secured thereto in any suitable manner, this rod 43 extending through the fluid displacement chamber 42, coaxially of the cylinder 26, into and through an opening 44 in the screw plug 32, to the outside of the shock absorber. In order to prevent leaks, a packing 45 is provided around the piston rod 43, this packing being maintained in sealing engagement with the end surface of the screw plug 32 and around the piston rod 43 by a cover member 46 attached to the casing 24. The piston has a passage 50 therethrough providing for the transfer of fluid from one side of the piston to the other, this passage having a reduced portion 51 providing a shoulder 52. Into the interiorly threaded end of the passage 50, opening into the fluid displacement chamber 42, a sleeve 53 is screwed, this sleeve providing a valve-seat for the valve 54 urged upon said seat by spring 55 interposed between the valve 54 and the shoulder 52.

A port 60 provides communication between the reservoir 25 and the fluid displacement chamber 41, an annular valve seat 61 being provided within this port. This valve seat is normally engaged by the intake valve 62 urged upon valve seat 61 by spring 63 interposed between the valve 62 and an abutment ring 64 fitting into an annular groove provided in the inner surface of port 60.

Valve 62 has a cylindrically shaped body portion 65 which slidably supports the pressure release valve 66, tubular in shape and closed at one end, particularly the end more adjacent the reservoir 25. Spring 68 interposed between valve 62 and abutment member 67 on valve 66 yieldably urges the head portion of valve 66 upon the valve 62. An opening 69 in the cylindrical wall of valve 66 is normally within the confines of the cylindrical body portion 65 of valve 62. However, when valve 66 is moved relatively to valve 62 by fluid pressure within chamber 41, then side opening 69 is uncovered and there is established a flow through valve 66, its side opening 69 into the reservoir 25, as will be described detailedly hereinafter.

Port 37 in the screw plug 32 has an annular valve seat 80 upon which valve 81 is yieldably urged by a spring 82.

The outer end of rod 43 is attached to the axle 21 in any suitable manner. In the present instance two rubber grommets 90 and 91 are provided around piston rod 43 on each side of a plate 92 attached to the vehicle axle, these rubber grommets 90 and 91 each having a metallic cap 93 and 94 which respectively urge the grommets 90 and 91 into engagement with the mounting plate 92 by the pressure of nuts 95 and 96 respectively, threadedly engaging the piston rod 43. In order to prevent dust from reaching the packing 45, a dust cover 98, of any flexible material, is secured to the member 46 on the shock absorber and metallic cap 93 respectively.

Figure 2:
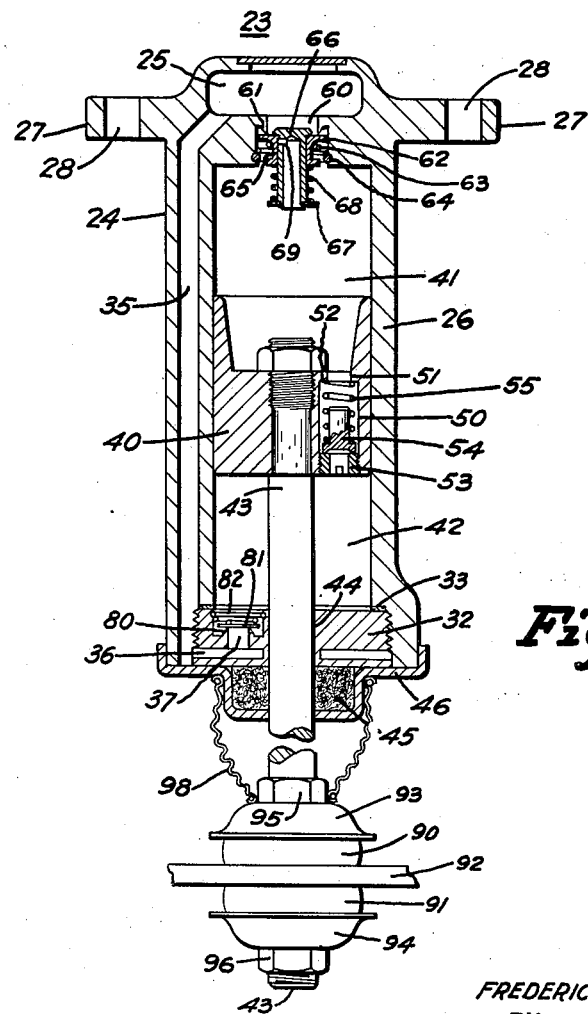
Fig. 2 is a longitudinal sectional view taken through the shock absorber.

From the foregoing it may be seen that the piston rod 43 extending through the fluid displacement chamber 42 displaces a certain amount of fluid within this chamber so that to get balanced fluid displacement, provisions are necessary within this shock absorber to compensate for this one sided fluid displacement. Chamber 42 being free of the piston rod 43 has no such fluid displacement and therefore it is necessary to introduce more fluid into chamber 41 than into chamber 42 which has a considerable amount of its fluid displaced by the presence of the piston rod 43. The compensation is attained in a manner as is set forth in the following description of the operation of the device:

When the road wheels, attached to the axle 21 but not shown for the sake of simplicity, strike an obstruction in the roadway, the axle 21 is thrust upwardly toward frame 20, causing springs 22 to be compressed. The inertia of the body supporting frame 20 prevents an instantaneous rise of said frame and consequently piston 40 will be movable relatively to the cylinder 26 so that the cubical area of chamber 41 will be reduced and that of chamber 42 will be increased. Fluid within chamber 41 will now have pressure exerted thereupon, which pressure when attaining a predetermined degree, will move valve 66 against the effect of spring 68 to uncover the side opening 69, thus to establish a restricted flow of fluid from chamber 41 through valve 66 and its side opening 69 into the reservoir 25. This restriction to the flow of fluid from chamber 41 will resist the approaching movement of axle 21 toward frame 20. While the piston 40 is moving upwardly as regards Fig. 2, fluid will be drawn into chamber 42 by the lifting of valve 81 against the effect of spring 82, thereby establishing a flow of fluid from the reservoir duct 35 through passage 36, port 37, past the valve 81.

The compression of springs 22 will urge the body carrying frame 20 upwardly, and this upward thrust of the body carrying frame 20 will be quite extensive if the springs 20 have been compressed to an appreciable degree. Under these corcumstances as the frame 20 moves away from axle 21, a movement of the piston 40 downwardly in cylinder 26 as regards Fig. 2 will obtain and consequently the cubical area of chamber 42 will now be decreased while the cubical area of chamber 41 is comparably increased.

Fluid in chamber 42 will have pressure exerted thereupon, which pressure assists spring 82 in closing valve 81, and therefore no fluid can flow from chamber 42 into the reservoir duct 35 via the port 37 and passage 36. However, when this pressure attains a predetermined value, valve 54 will be urged from its seat 53 against the effect of spring 55 to establish a restricted flow of fluid from the chamber 42 past valve 54 through passage 50 into the chamber 41, this restriction to the flow of fluid from chamber 42 resisting the separating movement of the frame and axle 20 and 21 respectively. The fluid supply to chamber 41 is not only provided from chamber 42 by the movement of valve 54 from its seat 53, for this supply would be insufficient inasmuch as there would not be enough fluid in chamber 42 to completely fill chamber 41 and therefore intake valve 62 is provided which, due to the suction effect in chamber 41 by the downward movement of piston 40 as regards Fig. 2, will be moved from its seat 61 to establish an additional flow into chamber 41 from the reservoir 25 through port 60, past valve 62.

From the aforegoing it may be seen that the valve mechanism in the present shock absorber is arranged to compensate for the fluid displacement in the one chamber 42 by the piston rod 43. Chamber 41 receives its fluid supply not only from the chamber 42 via the valve 54, but also from the reservoir 25 via the intake valve 62, and this same chamber 41 discharges directly into the reservoir 25 via the valve 66. On the other hand the chamber 42 having a fluid displacement therein by the piston rod 43 and thus being of lesser capacity (comparably speaking) than chamber 41, receives its fluid supply from the reservoir only via the duct 35, passage 36, port 37 and valve 81. This chamber, as has been mentioned, discharges into chamber 41 via the valve 54, thereby adding an additional supply into chamber 41 to the supply normally received from the reservoir 25 via valve 62.

Applicant's shock absorber is of simple structure and design, capable of being connected directly between the axle and frame of the vehicle, these attachments including the hinged connection 30 and the connection with the axle provided with rubber grommets 90 and 91 whereby rocking of the shock absorber due to relative lateral movements between the spring 22 and frame 20 may be compensated for.

While the form of embodiment of the present invention as herein disclosed, constitutes a preferred form, it is to be understood that other forms might be adopted, all coming within the scope of the claims which follow.

What is claimed is as follows:

1. An hydraulic shock absorber comprising, in combination, a casing providing a fluid reservoir and a cylinder; a piston in said cylinder forming two fluid displacement chambers therein; a piston actuating member extending through one of said chambers; intake and pressure release valves adapted respectively to establish substantially free flows of fluid into and restricted flows of fluid from said displacement chambers, said valves being so arranged that one of the said chambers receives fluid from both the reservoir and the other chamber while the said other chamber receives fluid from the reservoir only, to compensate for the displacement of the fluid by the piston actuating member.

2. An hydraulic shock absorber comprising, in combination, a casing providing a fluid reservoir and a cylinder; a piston in said cylinder forming two fluid displacement chambers therein; a piston actuating member extending through one of said chambers; intake and pressure release valves adapted respectively to establish substantially free flows of fluid into and restricted flows of fluid from said displacement chambers, said valves being so arranged that the displacement chamber having the piston actuating member extending therethrough receives fluid from the reservoir only and discharges fluid into the other displacement chamber while said other displacement chamber receives fluid from and discharges fluid into the reservoir, for compensating for the fluid displaced by the said piston actuating member.

3. An hydraulic shock absorber comprising, in combination, a casing providing a fluid reservoir and a cylinder; a piston forming two fluid displacement chambers; a piston actuating member extending through one of said chambers; means supported by the casing and adapted to establish a substantially unrestricted flow of fluid from the reservoir into said chambers; means supported by certain of said aforementioned means and adapted to establish a restricted flow of fluid from the one chamber into the reservoir; and another means supported by the piston and adapted to establish a restricted flow of fluid from the other chamber into said one chamber.

4. An hydraulic shock absorber comprising, in combination, a casing providing a fluid reservoir and a cylinder; a piston forming two fluid displacement chambers; a piston actuating member; a unitary valve mechanism adapted to establish a substantially free flow of fluid from the reservoir in the one chamber and a restricted flow of fluid from said chamber into the reservoir; and separate valve mechanisms adapted respectively to establish a substantially free flow of fluid from the reservoir into the other displacement chamber and a restricted flow of fluid from said other displacement chamber into the first mentioned of said chambers.

5. An hydraulic shock absorber comprising, in combination, a casing providing a fluid reservoir and a cylinder; a piston forming two fluid displacement chambers; a piston actuating member, a valve in the piston adapted to establish a restricted flow of fluid from the one displacement chamber into the other; another valve mechanism adapted to establish a substantially free flow of fluid into said one chamber; and a unitary valve mechanism adapted to establish a substantially free flow of fluid from the reservoir into said other displacement chamber and a restricted flow from said other chamber into the reservoir.

6. An hydraulic shock absorber comprising, in combination, a casing providing a fluid reservoir and a cylinder; a piston in said cylinder dividing it into two fluid displacement chambers; a piston operating member extending from the piston through the one displacement chamber to the outside of the casing; valves adapted to establish fluid flow from the reservoir into the respective chambers in response to the movement of the piston to increase their respective cubical area; and two pressure release valves adapted to establish restricted flows of fluid from the respective chambers in response to the movements of the piston to decrease the cubical area of their respective chambers, one of said valves discharging from one chamber into the other, the other of said valves discharging from the said other chamber into the reservoir.

7. An hydraulic shock absorber comprising, in combination, a casing providing a fluid reservoir and a cylinder; a piston in said cylinder forming two fluid displacement chambers therein; means for actuating said piston; ports connecting the respective displacement chambers with the reservoir and with each other; a valve mechanism in the one port adapted to establish a substantially free flow of fluid from the reservoir into one displacement chamber in response to the piston movement in one direction and a restricted flow of fluid from said chamber into the reservoir in response to the piston movement in the other direction; a valve for another port adapted to establish a substantially free flow of fluid from the reservoir into the other displacement chamber as the piston moves in said other direction; and a valve in the third port adapted to establish a restricted flow of fluid from said other displacement chamber into the said one chamber as the piston moves in said one direction.

8. An hydraulic shock absorber comprising, in combination, a casing providing a fluid reservoir and a cylinder, each end of the cylinder having a port communicating with the reservoir; a piston in said cylinder forming two fluid displacement chambers therein; a piston rod secured at one end to the piston, extending through one of said displacement chambers and a packing in the casing to the outside of said casing; a unitary valve mechanism in the one part adapted to establish a substantially free flow of fluid into the one displacement chamber and a restricted flow from said chamber in response to piston movement; a valve for the port of the displacement chamber through which the piston rod extends, adapted to establish a substantially free flow of fluid from the reservoir into said chamber and to prevent fluid to flow from said chamber; and a pressure release valve in the piston, adapted, in response to a predetermined fluid pressure in the chamber through which the piston rod extends, to establish a restricted flow into the other chamber.

9. In a hydraulic shock absorber adapted to control the approaching and separating movements of two relatively movable members, the combination with a casing providing a cylinder and a reservoir; a piston forming two fluid displacement chambers within the cylinder; means providing for a restricted flow of fluid from one displacement chamber and a substantially unrestricted flow of fluid into the other chamber in response to movement of the piston as the two relatively movable members approach each other; two separate means acting in response to the movement of the piston as the relatively movable members separate, the first supporting one of the aforementioned means and providing for a substantially free flow of fluid into one displacement chamber, the second means providing for a restricted flow of fluid from the other chamber into the first mentioned displacement chamber.

FREDERICK D. FUNSTON.